United States Patent
Taylor et al.

(10) Patent No.: US 11,818,452 B2
(45) Date of Patent: Nov. 14, 2023

(54) CAMERA WITH PHASED METALENS

(71) Applicant: Aptiv Technologies Limited, St. Michael (BB)

(72) Inventors: Ronald M. Taylor, Greentown, IN (US); James Nickolaou, Clarkston, MI (US)

(73) Assignee: Aptiv Technologies Limited, St. Michael (BB)

(*) Notice: Subject to any disclaimer, the term of this patent is extended or adjusted under 35 U.S.C. 154(b) by 237 days.

(21) Appl. No.: 17/367,257

(22) Filed: Jul. 2, 2021

(65) Prior Publication Data

US 2021/0337095 A1 Oct. 28, 2021

Related U.S. Application Data

(63) Continuation of application No. 16/773,360, filed on Jan. 27, 2020, now Pat. No. 11,089,197.

(51) Int. Cl.
*H04N 23/58* (2023.01)
*H04N 23/67* (2023.01)

(52) U.S. Cl.
CPC ........... *H04N 23/58* (2023.01); *H04N 23/672* (2023.01)

(58) Field of Classification Search
CPC .......... G01J 3/0208; G01J 3/0224; G01J 3/18; G01J 3/2823; G02B 1/002; G02B 3/0043; G02B 5/1809; G02B 5/1861; G02B 6/32
See application file for complete search history.

(56) References Cited

U.S. PATENT DOCUMENTS

| | | | |
|---|---|---|---|
| 4,693,555 A | 9/1987 | Arai et al. | |
| 6,144,510 A | 11/2000 | Neil et al. | |
| 10,362,203 B2 | 7/2019 | Taylor et al. | |
| 10,408,416 B2 | 9/2019 | Khorasaninejad et al. | |
| 10,437,012 B1 * | 10/2019 | Gurin | B60R 1/00 |
| 11,089,188 B1 | 8/2021 | Taylor et al. | |
| 11,089,197 B1 | 8/2021 | Taylor et al. | |
| 11,201,993 B1 | 12/2021 | Wang et al. | |
| 11,431,881 B2 | 8/2022 | Taylor et al. | |
| 2003/0226951 A1 | 12/2003 | Ye et al. | |

(Continued)

FOREIGN PATENT DOCUMENTS

| | | |
|---|---|---|
| CN | 102472884 A | 5/2012 |
| CN | 202975472 U | 6/2013 |

(Continued)

OTHER PUBLICATIONS

"Extended European Search Report", EP Application No. 20207221.1, dated Mar. 26, 2021, 8 pages.

(Continued)

*Primary Examiner* — Amy R Hsu
(74) *Attorney, Agent, or Firm* — Sawtooth Patent Group PLLC

(57) ABSTRACT

A camera includes a phased metalens positioned between an objective lens and an imager of the camera. The phased metalens is configured to adjust a focus plane of an image in a field of view of the camera in response to changes in an operating temperature of the camera. The phased metalens adjusts the focus plane for multiple frequencies or wavelengths light such that all light wave-fronts exiting the phased metalens arrive at the imager at a same time.

16 Claims, 7 Drawing Sheets

(56) References Cited

U.S. PATENT DOCUMENTS

| | | | |
|---|---|---|---|
| 2007/0221826 A1 | 9/2007 | Bechtel et al. | |
| 2010/0265048 A1 | 10/2010 | Lu et al. | |
| 2011/0080479 A1 | 4/2011 | Trumbo et al. | |
| 2013/0274923 A1 | 10/2013 | By | |
| 2015/0293330 A1 | 10/2015 | Gutierrez | |
| 2016/0094841 A1 | 3/2016 | Wang et al. | |
| 2017/0082263 A1* | 3/2017 | Byrnes | F21K 9/64 |
| 2017/0146806 A1 | 5/2017 | Lin | |
| 2017/0195545 A1 | 7/2017 | Campbell et al. | |
| 2017/0201744 A1 | 7/2017 | Wong et al. | |
| 2017/0219739 A1* | 8/2017 | Lin | G02B 5/008 |
| 2018/0059354 A1 | 3/2018 | Gutierrez et al. | |
| 2018/0292644 A1 | 10/2018 | Kamli et al. | |
| 2019/0094489 A1 | 3/2019 | Dobashi | |
| 2019/0154877 A1 | 5/2019 | Capasso et al. | |
| 2019/0170314 A1 | 6/2019 | Lenef et al. | |
| 2019/0178720 A1 | 6/2019 | Padilla et al. | |
| 2019/0383969 A1 | 12/2019 | Badano et al. | |
| 2020/0001787 A1 | 1/2020 | Lu et al. | |
| 2020/0096672 A1 | 3/2020 | Yu et al. | |
| 2020/0099851 A1 | 3/2020 | Chino et al. | |
| 2020/0183050 A1 | 6/2020 | Lin et al. | |
| 2020/0225386 A1* | 7/2020 | Tsai | G02B 1/002 |
| 2020/0264343 A1* | 8/2020 | Han | G02B 1/14 |
| 2021/0003382 A1 | 1/2021 | Adie et al. | |
| 2021/0044748 A1 | 2/2021 | Hu et al. | |
| 2021/0068665 A1 | 3/2021 | Pahlevaninezhad et al. | |
| 2021/0080819 A1 | 3/2021 | Terasawa et al. | |
| 2021/0132272 A1* | 5/2021 | Zhu | G01J 3/2823 |
| 2021/0172879 A1 | 6/2021 | Chen et al. | |
| 2021/0235001 A1 | 7/2021 | Taylor et al. | |
| 2021/0307608 A1 | 10/2021 | Hu et al. | |
| 2021/0337140 A1 | 10/2021 | Siddique et al. | |

FOREIGN PATENT DOCUMENTS

| | | |
|---|---|---|
| CN | 108241208 A | 7/2018 |
| CN | 108802862 A | 11/2018 |
| CN | 208283579 U | 12/2018 |
| CN | 109164518 A | 1/2019 |
| CN | 109507765 A | 3/2019 |
| CN | 109561243 A | 4/2019 |
| CN | 110455418 A | 11/2019 |
| CN | 109391754 B | 11/2020 |
| EP | 3385766 A1 | 10/2018 |
| EP | 3445050 A1 | 2/2019 |
| EP | 3855246 A1 | 7/2021 |
| EP | 3992671 A1 | 5/2022 |
| IN | 111103739 A | 5/2020 |
| WO | 2018118984 A1 | 6/2018 |
| WO | 2020214617 A1 | 10/2020 |

OTHER PUBLICATIONS

"Non-Final Office Action", U.S. Appl. No. 16/773,360, dated Dec. 22, 2020, 11 pages.

"Notice of Allowance", U.S. Appl. No. 16/773,360, dated Apr. 6, 2021, 7 pages.

"Notice of Allowance", U.S. Appl. No. 17/087,526, dated Apr. 14, 2021, 10 pages.

Afridi, et al., "Electrically Driven Varifocal Silicon Metalens", Oct. 2018, 17 pages.

Ding, et al., "Graphene aperture-based metalens for dynamic focusing of terahertz waves", Oct. 15, 2018, 13 pages.

Jin, et al., "Temperature-tuned and excellent omnidirectional bending of light to the normal for energy concentration in an index-continuous structure", Jul. 27, 2020, 10 pages.

Khorasaninejad, et al., "Metalenses at Visible Wavelengths: Diffraction-limited Focusing and Subwavelength Resolution Imaging", Jun. 3, 2016, pp. 1190-1193.

Li, et al., "A Metalens-Based Virtual Reality (VR) / Augmented Reality (AR) System", Jan. 2020, 2 pages.

Liu, et al., "Ultrathin van der Waals metalenses", Oct. 2018, 22 pages.

Yang, et al., "Multiobjective Firefly Algorithm for Continuous Optimization", Apr. 2013, 17 pages.

Yu, et al., "Flat Optics with Designer Metasurfaces", Nature Materials, vol. 13, Feb. 2014, pp. 139-150.

"Foreign Office Action", CN Application No. 202011378329.3, dated Dec. 31, 2021, 27 pages.

She, et al., "Adaptive Metalenses with Simultaneous Electrical Control of Focal Length, Astigmatism, and Shift", Feb. 23, 2018, 8 pages.

"Foreign Office Action", CN Application No. 202011378329.3, dated Jan. 28, 2023, 11 pages.

"Foreign Office Action", EP Application No. 20207221.1, dated Apr. 13, 2023, 5 pages.

"Foreign Office Action", CN Application No. 202011378329.3, dated Sep. 5, 2022, 16 pages.

"Extended European Search Report", EP Application No. 21181685.5, dated Nov. 24, 2021, 10 pages.

Jang, et al., "Complex wavefront engineering with disorder-engineered metasurfaces", Jun. 27, 2017, 21 pages.

Kamali, et al., "Conformal and Tunable Optical Dielectric Metasurfaces Based on Flexible Stretchable Substrates", Oct. 2016, pp. 406-407.

"Epoxy Adhesive Application Guide", Epoxy Technology, Jan. 1, 2016, 48 pages.

"Extended European Search Report", EP Application No. 18185005.8, dated Oct. 31, 2018, 7 pages.

"Foreign Office Action", CN Application No. 201810876682.0, dated Apr. 10, 2020, 12 pages.

"Foreign Office Action", CN Application No. 202110698978.X, dated Jun. 29, 2022, 16 pages.

"Foreign Office Action", EP Application No. 18185005.8, dated May 12, 2021, 4 pages.

"Foreign Office Action", EP Application No. 18185005.8, dated Sep. 8, 2020, 5 pages.

"Foreign Office Action", EP Application No. 18185005.8, dated Nov. 11, 2019, 7 pages.

Yacobi, et al., "Adhesive Bonding in Microelectronics and Photonics", Journal of Applied Physics, American Institute of Physics, vol. 91, No. 10, May 15, 2002, 36 pages.

"Extended European Search Report", EP Application No. 22197227.6, dated May 19, 2023, 11 pages.

"Extended European Search Report", EP Application No. 22197707.7, dated May 19, 2023, 11 pages.

Bitzer, et al., "Active Alignment for Cameras in Mobile Devices and Automotive Applications", 2010 12th Electronics Packaging Technology Conference, Dec. 8, 2010, pp. 260-264.

Bräuniger, et al., "Automated Assembly of Camera Modules using Active Alignment with up to Six Degrees of Freedom", Mar. 8, 2014, 8 pages.

"Extended European Search Report", EP Application No. 22198914.8, dated Aug. 22, 2023, 9 pages.

"Extended European Search Report," EP Application No. 23163100.3, dated Sep. 18, 2023, 8 pages.

Jacob Engelberg et al., "Near-IR wide field-of-view Huygens metalens for outdoor imaging applications", arxiv.org, Cornell University Library, 201 Olin Library Cornell University, Ithaca, NY 14853, Jan. 22, 2019, XP081006647, 21 pages.

* cited by examiner

CAMERA WITH PHASED METALENS

CROSS-REFERENCE TO RELATED APPLICATION

The present application is a continuation of and claims priority to U.S. patent application Ser. No. 16/773,360, filed Jan. 27, 2020, the entire disclosure of which is hereby incorporated by reference.

TECHNICAL FIELD OF DISCLOSURE

This disclosure generally relates to a camera.

BACKGROUND OF THE DISCLOSURE

Fixed focus cameras are typically aligned and focused at room temperature. These cameras may experience defocus, also known as a change in back focal length, over operating temperatures associated with various automotive applications due to thermal expansion and contraction of the camera.

SUMMARY OF THE DISCLOSURE

An example of a camera includes a phased metalens positioned between an objective lens and an imager of the camera. The phased metalens is configured to adjust a focus plane of an image in a field of view of the camera in response to changes in an operating temperature of the camera.

In an example having one or more features of the camera of the previous paragraph, the phased metalens is positioned within 1 mm of an imager focal plane.

In an example having one or more features of the camera of any of the previous paragraphs, the phased metalens adjusts the focus plane for multiple frequencies or wavelengths of the light.

In an example having one or more features of the camera of any of the previous paragraphs, the wavelengths range from 400 nanometers (400 nm) to 1600 nm.

In an example having one or more features of the camera of any of the previous paragraphs, the phased metalens adjusts the focus plane over a temperature range of about 145 degrees Celsius.

In an example having one or more features of the camera of any of the previous paragraphs, the phased metalens adjusts the focus plane over changes in a focal length of about 16 microns (16 μm).

In an example having one or more features of the camera of any of the previous paragraphs, the phased metalens comprises a plurality of sub-wavelength structures positioned at predetermined coordinates across the phased metalens.

In an example having one or more features of the camera of any of the previous paragraphs, the plurality of sub-wavelength structures range from two times to eight times smaller than a wavelength of the light transmitted through the phased metalens.

In an example having one or more features of the camera of any of the previous paragraphs, the plurality of sub-wavelength structures are grouped into a plurality of arrangements having unique phase profiles; the unique phase profiles configured to adjust a phase of the light transmitted through the plurality of arrangements.

In an example having one or more features of the camera of any of the previous paragraphs, the unique phase profiles are based on the arrangement's respective radial distance from a center of the phased metalens.

In an example having one or more features of the camera of any of the previous paragraphs, the unique phase profiles are based on an operating temperature of the camera.

In an example having one or more features of the camera of any of the previous paragraphs, the plurality of arrangements define a plurality of resolution units.

In an example having one or more features of the camera of any of the previous paragraphs, the plurality of resolution units located at a same radius from a center of the phased metalens have identical phase profiles.

In an example having one or more features of the camera of any of the previous paragraphs, the plurality of resolution units located at a different radius from a center of the phased metalens have different phase profiles.

In an example having one or more features of the camera of any of the previous paragraphs, a size of one resolution unit is equal a size of four image pixels.

In an example having one or more features of the camera of any of the previous paragraphs, each image pixel includes about 30 to 36 sub-wavelength structures.

In an example having one or more features of the camera of any of the previous paragraphs, each resolution unit includes about 120 to 144 sub-wavelength structures.

In an example having one or more features of the camera of any of the previous paragraphs, as the respective radial distance of the plurality of resolution units increases from a center of the phased metalens, the unique phase profiles increase an amount of phase adjustment for a given wavelength of light.

In an example having one or more features of the camera of any of the previous paragraphs, as a radial distance of the plurality of resolution units increases from a center of the phased metalens, the unique phase profiles increase an amount of phase adjustment for decreasing wavelengths of the light.

In an example having one or more features of the camera of any of the previous paragraphs, as a radial distance of the plurality of resolution units increases from a center of the phased metalens, the unique phase profiles increase an amount of phase adjustment for a given temperature.

In an example having one or more features of the camera of any of the previous paragraphs, as a radial distance of the plurality of resolution units increases from a center of the phased metalens, the unique phase profiles increase an amount of phase adjustment for increasing temperatures.

In an example having one or more features of the camera of any of the previous paragraphs, all light wave-fronts exiting the phased metalens arrive at the imager at a same time.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
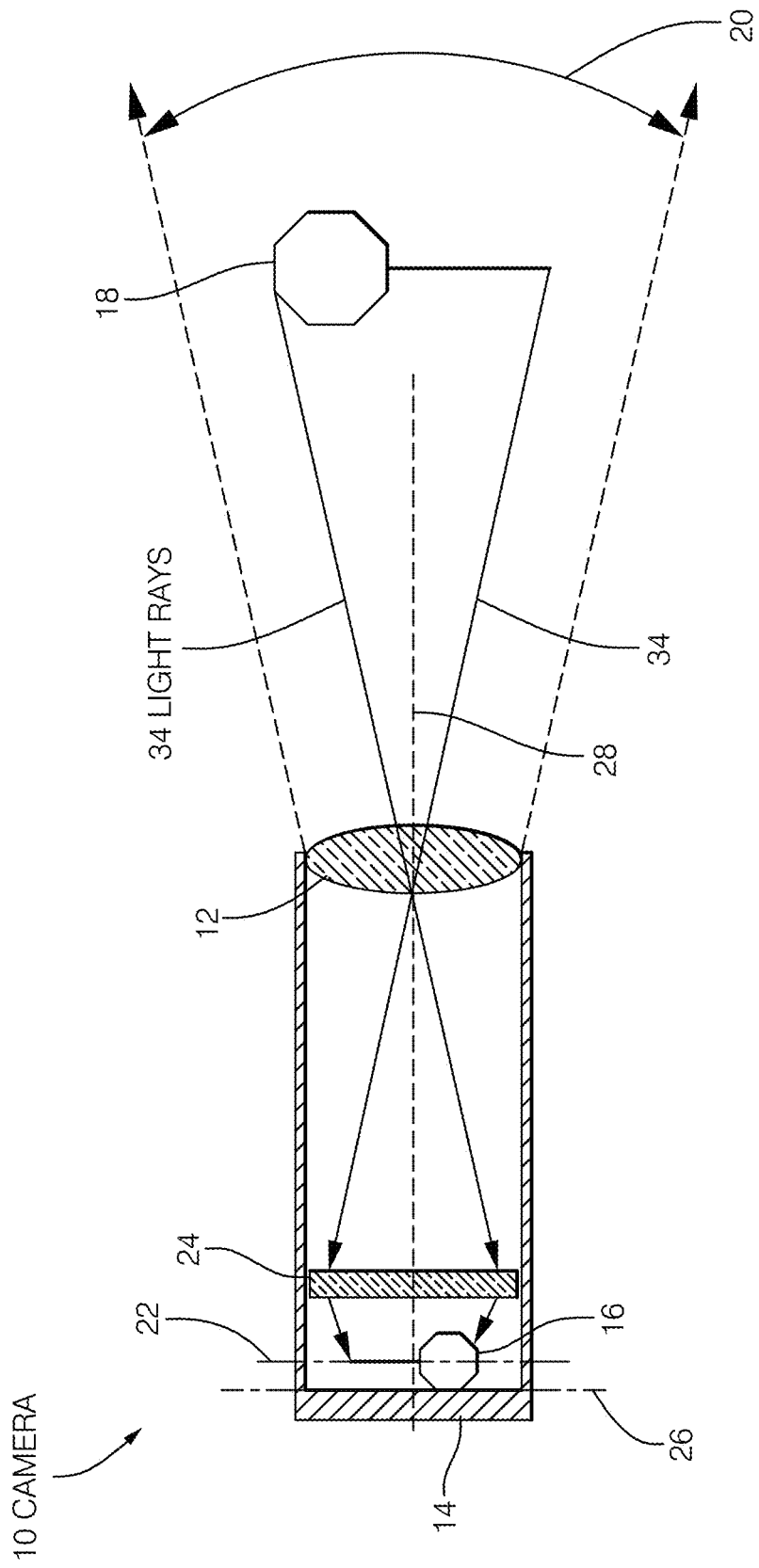
FIG. 1 is an illustration of a cross sectional view of a camera, in accordance with one example.

FIG. 1 illustrates a cross sectional view of a camera 10 that includes an objective lens 12 and an imager 14. While the examples illustrated herein disclose the camera 10, it will be appreciated that the disclosure also applies to other devices or sensors that sense electromagnetic radiation, such as light detection and ranging (LiDAR) sensors. Multiple camera lenses (not shown) of varying geometries may be used in the camera 10, depending on the application requirements. The imager 14 may be in electrical communication with a controller circuit (not shown) to process an image 16 of an object 18 in a field of view 20 of the camera 10. In the example illustrated in FIG. 1, a focal length of the camera 10 is fixed. That is, the camera 10 does not include a mechanical or electrical focus adjustment device to refocus the image 16 when a focus plane 22 of the camera 10 moves away from the imager 14 (i.e., a defocus). In an example, thermal expansion and contraction of the camera 10, due to an operating temperature variation, may cause the camera 10 to defocus. It will be understood that the focus plane 22 may move in a positive direction (i.e., toward the objective lens 12) or a negative direction (i.e., toward the imager 14) along an optical axis 28 of the camera 10, due to thermal expansion or thermal contraction of the camera 10.

A typical camera used for advanced driver assistance systems (ADAS) may be required to operate over a temperature range of −40° C. to +105° C. ADAS cameras are typically focused at 25° C. Depending on the materials used in the camera body (not specifically shown), spacers, and lenses, this temperature range may result in a change in the focal length of the camera 10 by as much as 16 microns (16 μm). ADAS cameras, that have fixed focus lenses with relatively large apertures and relatively low f-stops, have a reduced depth of focus compared to more expensive adjustable focus cameras. As a result, the thermal expansion of ADAS cameras over the 145° C. temperature range will cause a significant and measurable (e.g., 25% to 50%) degradation in an image quality, which may negatively affect the ADAS systems. Autonomous vehicle camera requirements are continuing to drive toward smaller camera imager 14 pixel sizes (e.g., 2 μm), higher density focal planes (e.g., 8 Megapixel arrays), and higher spatial frequency contrast image quality requirements (e.g., greater than 75 line pairs/mm). Consequently, the image degradation over temperature for the larger format cameras will be proportionately higher and reduce object detection performance.

For a traditional fixed focus lens system, a change in back focal length of 15 μm-20 μm would require the same movement by the complete lens system, or could be accomplished by, a) introduction of a lens element index of refractive change (e.g., 6%-9% or representing a delta change of 0.010-0.014), and/or b) lens element material thickness change (e.g., 20 μm-30 μm), and/or c) curvature change (e.g., 50 mm radius of curvature), and/or d) smaller contributions by combinations of the above.

To address the defocus issue of the fixed focus camera 10, a phased metalens 24 is positioned between the objective lens 12 and the imager 14 of the camera 10, as illustrated in FIG. 1. The phased metalens 24 is configured to adjust the focus plane 22 of the image 16 in the field of view 20 of the camera 10 in response to changes in the operating temperature of the camera 10. The phased metalens 24 accomplishes this by shifting a phase of the incoming light rays via sub-wavelength structures 25, as will be described in more detail below. These sub-wavelength structures 25 (also referred to as nanostructures) may be deposited on a relatively thin, generally planar, substrate of optically transparent material (e.g., optical glass), and may be formed of metamaterials with structural features that are capable of manipulating the light waves. In an example, the metamaterials are fabricated using known lithographic processes from compounds such as titanium dioxide, silicon nitride, boron nitride, molybdenum disulfide, or combinations thereof. The metamaterials may be selected based on the wavelengths of the electromagnetic radiation being sensed. In an example, titanium dioxide may be selected for light in the visible and near infrared spectrum. In an example, silicon nitride may be selected for light in the visible spectrum. In an example, boron nitride may be selected for electromagnetic radiation at wavelengths below the visible and near infrared spectrum (e.g., ultraviolet light). In an example, molybdenum disulfide may be selected for electromagnetic radiation at wavelengths in the near infrared spectrum.

Figure 2:
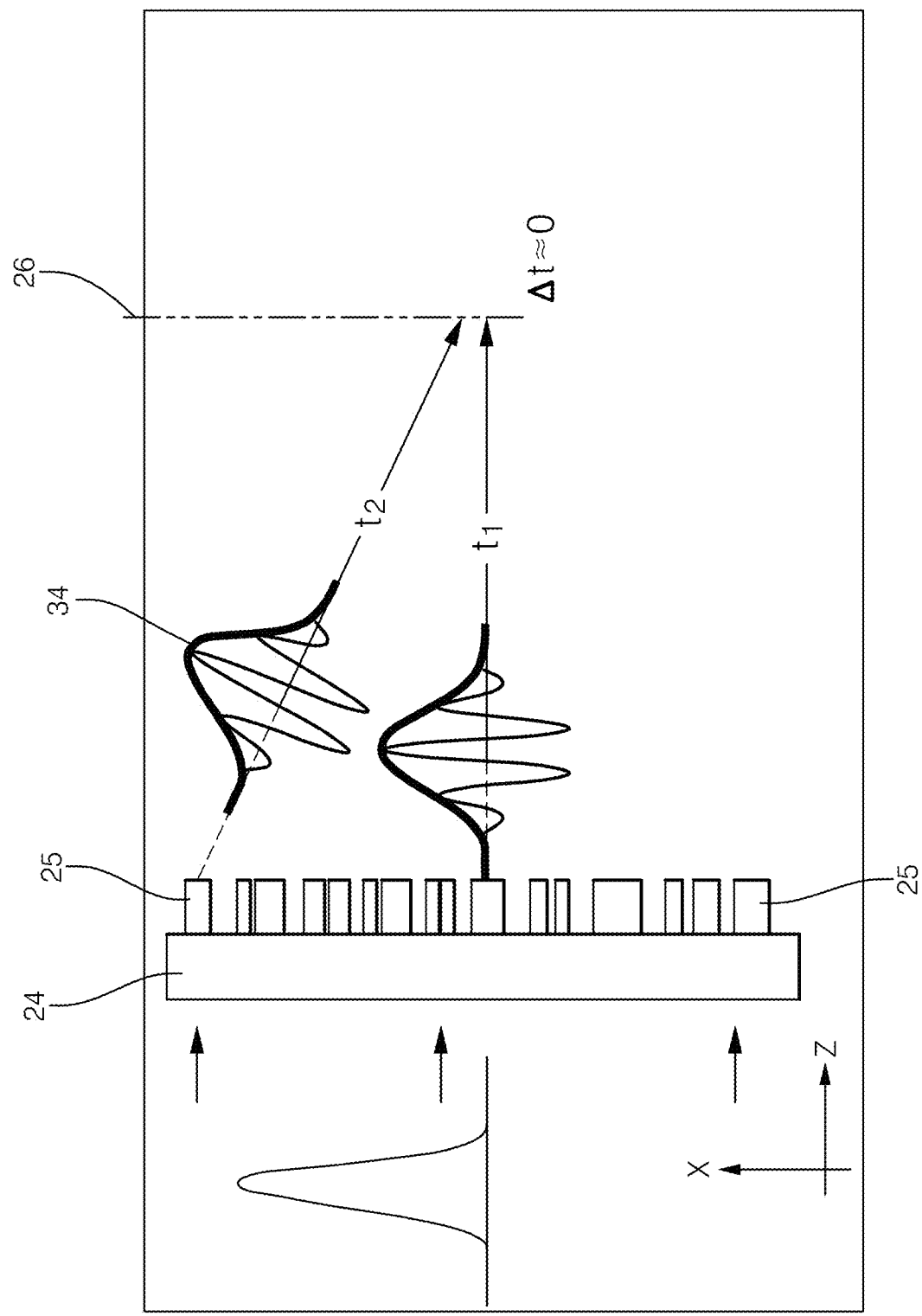
FIG. 2 illustrates an example of a focus characteristic of a phased metalens, in accordance with one example.

FIG. 2 illustrates an example where the wave fronts of the light rays exiting from different regions of the phased metalens 24 reach the imager focal plane 26 at a same time (i.e., Δt=0, in phase). In an example, the sub-wavelength structures 25 are fabricated on an exit side of the substrate (i.e., the side facing the imager 14). In an example, a cross section of the sub-wavelength structures 25 normal to the incident light rays are rectangular. In another example, the cross section of the sub-wavelength structures 25 normal to the incident light rays are circular. The phased metalens 24 is configured to shift the phase of the incoming light rays such that all light wave-fronts exiting the phased metalens 24 arrive at the imager 14 at a same time, resulting in good focus for all temperature conditions. That is, the phased metalens 24 delays the light wave-fronts by differing amounts, depending on the position of the sub-wavelength structures 25 on the phased metalens 24, such that all the light wave-fronts reaching the imager 14 are in-phase. The phased metalens 24 accomplishes this by achieving near diffraction limited focusing over the incoming light wavelengths using precisely defined nanoscale sub-wavelength resolution structures. In an example, the phase relationship for the phased metalens 24 is defined by the design wavelength, a sub-wavelength structure shape, and the phased metalens 24 focal length, using the known equation below, $$\varphi_{nf}(x, y) = \frac{2\pi}{\lambda_d}(f - \sqrt{x^2 + y^2 + f^2})$$

where $\lambda_d$ is the design wavelength, f is the focal length for the converging phased metalens 24 and x and y are the coordinates of the sub-wavelength structures 25 on the phased metalens 24. To account for the focus variation across the operating temperature range, the phased metalens 24 includes the sub-wavelength structures 25 arranged in unique phase profiles for the multiple focal lengths within the resolution unit 30 that result from the temperature changes of the camera 10. That is, the phased metalens 24 includes multiple unique phase profiles designed for multiple offsets of the focal length, so that as the focal length is offset by the temperature change, the light rays exiting the phased metalens 24 will remain in phase.

Figure 3:
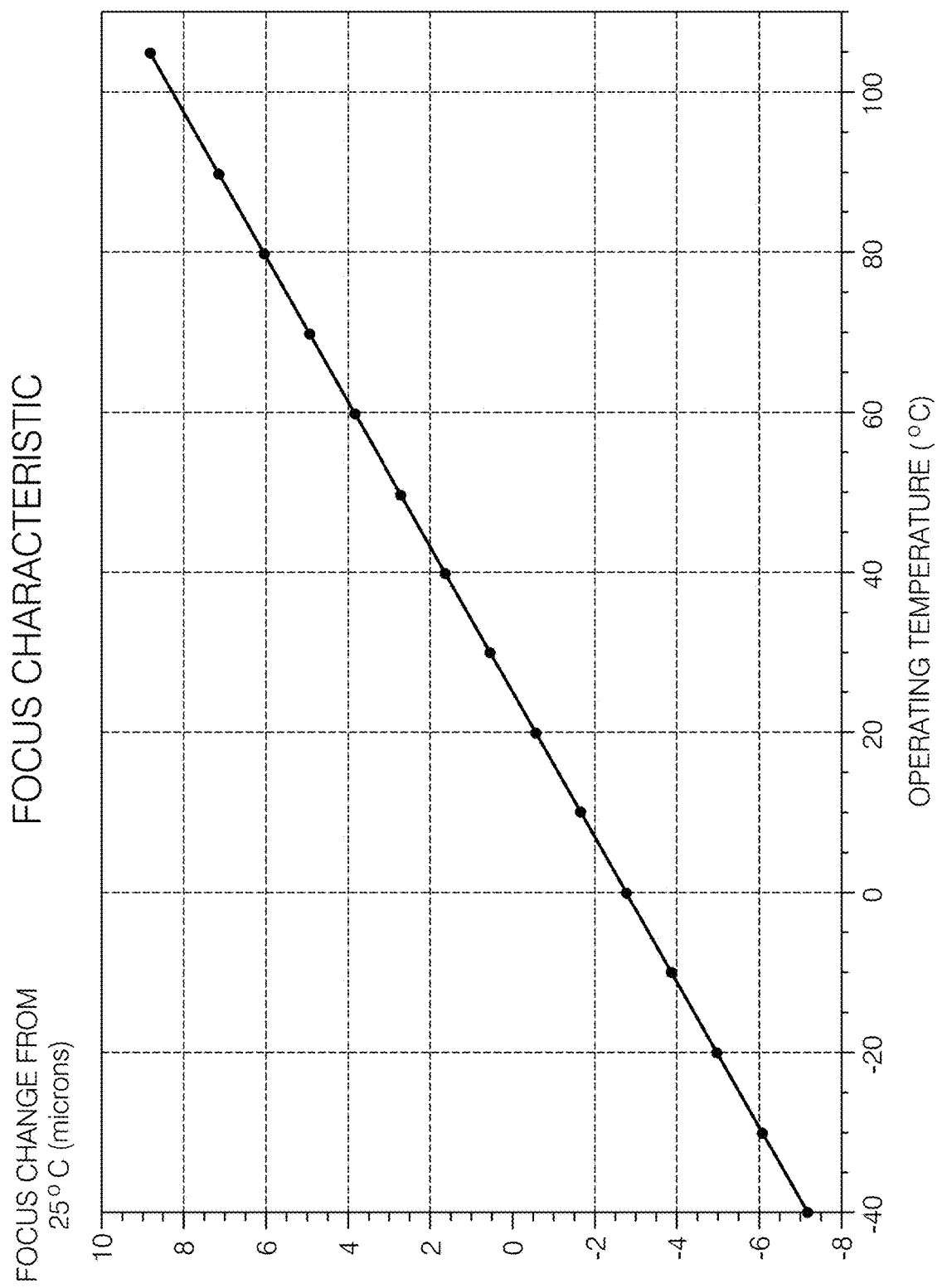
FIG. 3 is an illustration of the phased metalens viewed along an optical axis of the camera of FIG. 1, in accordance with one example.

FIG. 3 illustrates an example of a focus characteristic of the phased metalens 24 of FIG. 1. The phased metalens 24 is configured to adjust the focus plane 22 over the temperature range of about 145° C. and over the associated changes in the focal length of about 16 µm. The phased metalens 24 adjusts the focus plane 22 for multiple frequencies or wavelengths of the light. In an example, the wavelengths range from about 400 nm to about 1600 nm (i.e., visible light to near infrared light). In another example, the wavelengths range from about 400 nm to about 700 nm (i.e., visible light only). In another example, the wavelengths range from about 700 nm to about 1600 nm (i.e., near infrared light only).

An aspect of the camera 10 is that the phased metalens 24 is placed in close proximity to the imager 14. In an example, the phased metalens 24 is positioned within 1 mm of an imager focal plane 26 (i.e., the imaging surface of the imager 14). In an example, a thickness of the metalens 24 is less than 1 mm, and preferably less than 25 µµm. This relatively thin structure enables the metalens 24 to be positioned in the typically narrow space between the fixed focus objective lens 12 and the imager focal plane 26. This positioning enables a greater flexibility allowing for the compensation of the thermal driven defocus while otherwise being independent of the existing fixed lens system.

Figure 4:
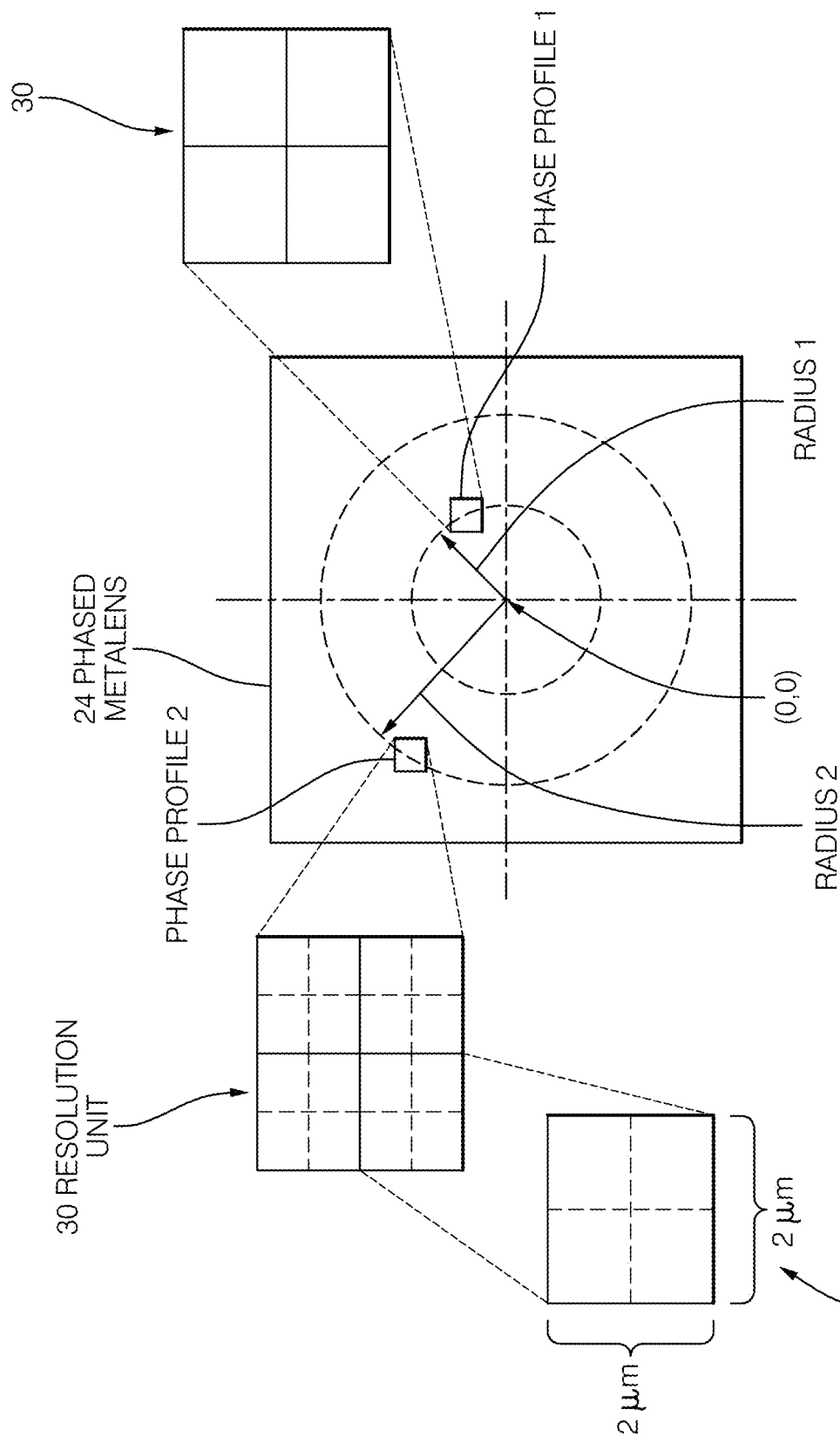
FIG. 4 is an illustration of the phased metalens viewed along an optical axis of the camera, in accordance with one example.

FIG. 4 illustrates the phased metalens 24 viewed along an optical axis 28 of the camera 10. The phased metalens 24 comprises a plurality of sub-wavelength structures 25 (not shown) positioned at predetermined coordinates across the phased metalens 24. In an example, the plurality of sub-wavelength structures 25 range from two times to eight times smaller than the wavelength of the light transmitted through the phased metalens 24. In an example, the sub-wavelength structures 25 that shift blue light (having wavelengths that range from 450 nm-485 nm) would have cross sectional dimensions normal to the incident light rays that range from 0.050 µm to 0.150 µm. It will be recognized that light with longer wavelengths will require larger sub-wavelength structures 25 to cause the phase shift, and that light with shorter wavelengths will require smaller sub-wavelength structures 25 to cause the phase shift.

Referring back to FIG. 4, the plurality of sub-wavelength structures 25 are grouped into a plurality of arrangements having unique phase profiles that define a plurality resolution units 30 (RUs 30). That is, the plurality of sub-wavelength structures 25 are arranged into RUs 30 that have unique phase profiles that delay the light transmitted through the RUs 30 by differing amounts of time. These unique phase profiles are configured to adjust the phase of the light transmitted through the plurality of RUs 30 based on the operating temperature of the camera 10, and also based on the RU's 30 respective radial distance from a center of the phased metalens 24. FIG. 4 illustrates an example of two separate RUs 30 isolated from the plurality of RUs 30, having different phase profiles as denoted by "PHASE PROFILE 1" within the RU 30 positioned at "RADIUS 1", and by "PHASE PROFILE 2" within the RU 30 positioned at "RADIUS 2". In the example illustrated in FIG. 4, the plurality RUs 30 located at a same radius (e.g. RADIUS 1) from a center of the phased metalens 24 have identical phase profiles, and the plurality RUs 30 located at a different radius (e.g. RADIUS 2) from the center of the phased metalens 24 have different phase profiles.

Referring again to FIG. 4, in an example, a size of one RU 30 is equal the size of four image pixels 32 of the imager 14. The maximum useful image resolution is limited to the Nyquist frequency, i.e., the resolution in pixel size scaled to the camera 10 imager focal plane 26 pixel size. In this example, this is equivalent to the size of four image pixels 32. In an example, for the camera 10 with image pixels 32 measuring 2 µm×2 µm in size, the limiting resolution is an area of 4 µm×4 µm. Within this area, image information is sub-resolved or is not able to be reproduced or imaged, as such the area of 4 µm×4 µm is the limiting dimension of the RU 30. Table 1 below illustrates an example of a scale of various characteristics of a 3 mm×3 mm phased metalens 24.

TABLE 1

3 mm × 3 mm PHASED METALENS

| FEATURE | SIZE |
| --- | --- |
| RESOLUTION UNIT: | 16 µm² (4 µm × 4 µm) |
| IMAGE PIXEL AREA: | 4 µm² (2 µm × 2 µm) |
| SUB-WAVELENGTH STRUCTURES: | |
| WIDTH | 0.040 µm-0.100 µm |
| LENGTH | 0.150 µm-0.400 µm |
| HEIGHT | 0.400 µm-0.600 µm |
| ROTATION | 0-2π RADIANS |
| AREA | 0.040 µm²-0.200 µm² |
| NUMBER OF SUB-WAVELENGTH STRUCTURES WITHIN AN IMAGE PIXEL: | 30-36 |
| NUMBER OF SUB-WAVELENGTH STRUCTURES WITHIN A RESOLUTION UNIT: | 120-144 |
| NUMBER OF RUs: | 562,500 |
| NUMBER OF SUB-WAVELENGTH STRUCTURES: | 67.5 MILLION-81.0 MILLION |

Referring to Table 1, in an example, each RU 30 includes about 120 to 144 sub-wavelength structures 25. In this example, a focus characteristic encompassing a range of 11-12 discrete wavelengths with 11-12 discrete temperature offsets may be included within a single RU 30.

Figure 5A:
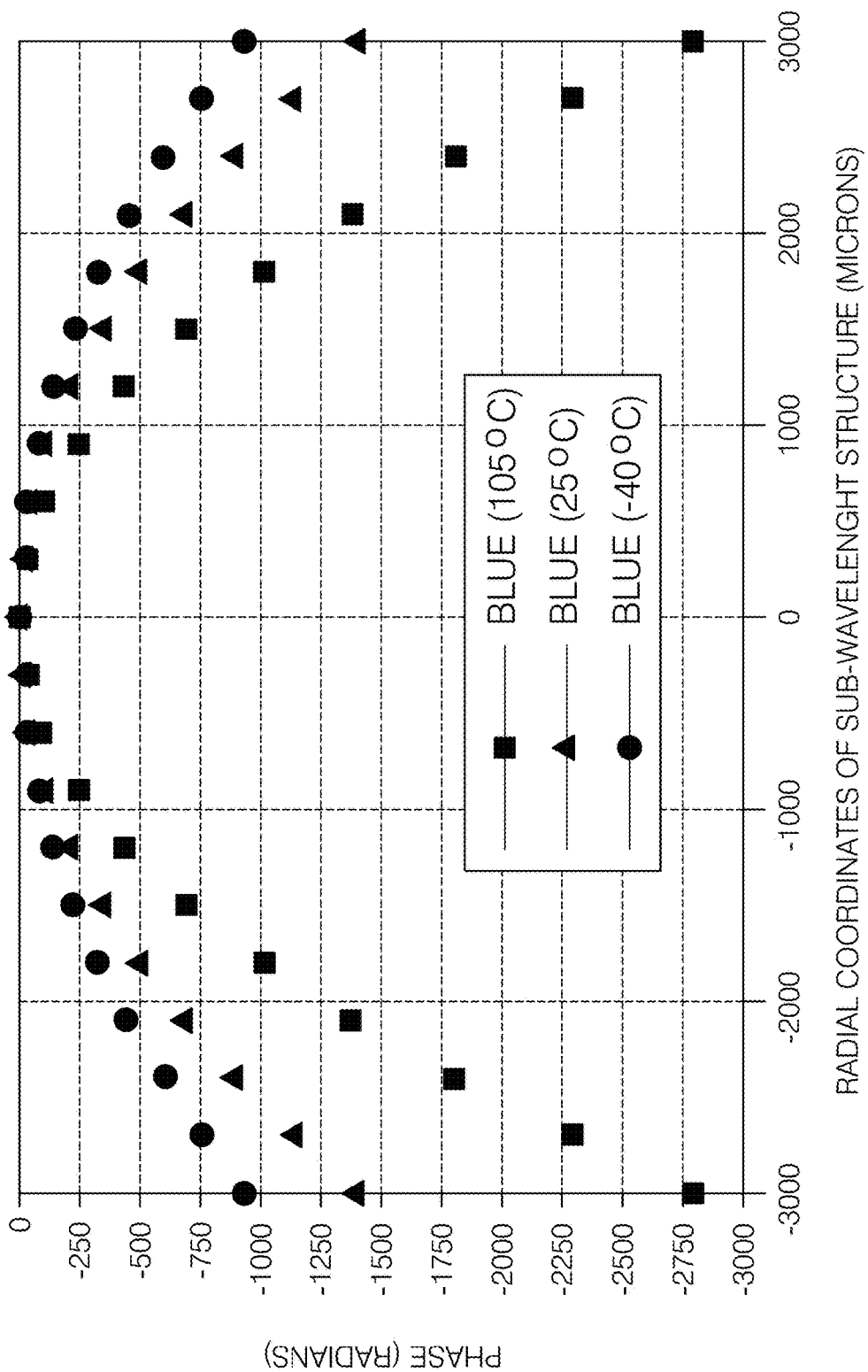
FIG. 5A is a plot of phase adjustment for blue light, in accordance with one example.
Figure 5B:
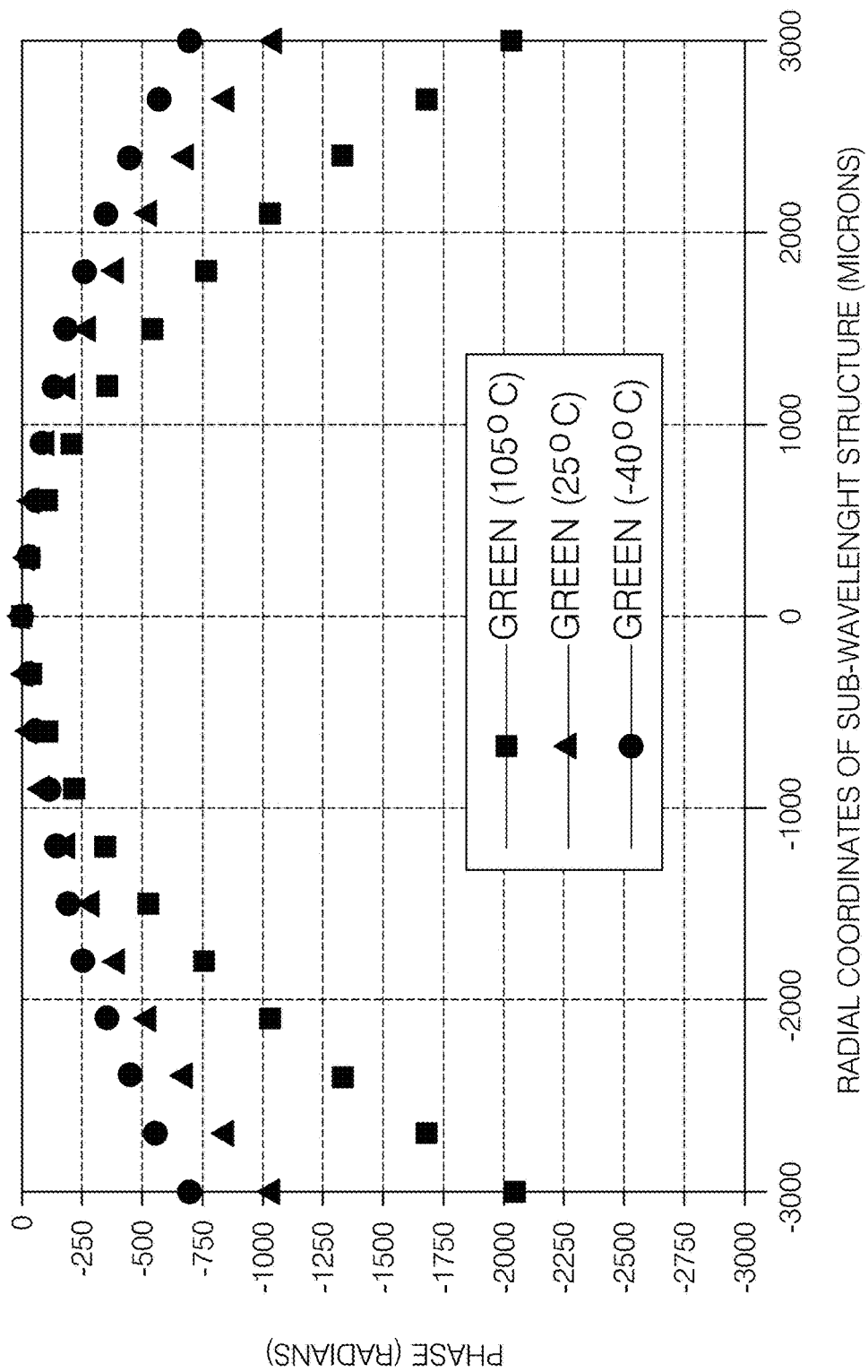
FIG. 5B is a plot of phase adjustment for green light, in accordance with one example.
Figure 5C:
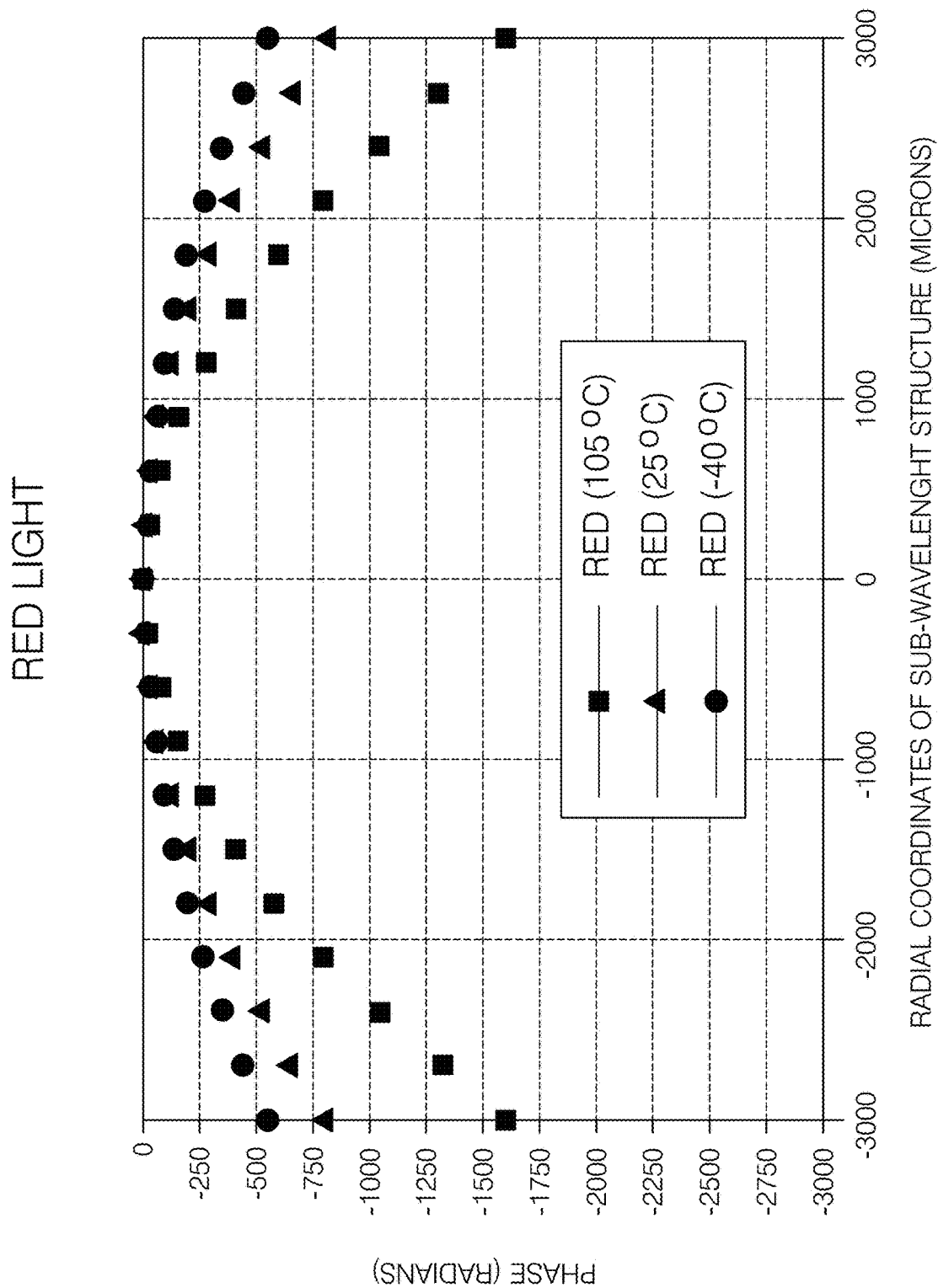
FIG. 5C is a plot of phase adjustment for red light, in accordance with one example.

FIGS. 5A-5C are plots of radial distances of the sub-wavelength structures 25 from the center of the phased metalens 24 versus a phase adjustment of the light. In this example, three colors (i.e. wavelengths) of visible light (blue, green, and red), at three operating temperatures (−40° C., 25° C., and +105° C.) are used to illustrate how the phased metalens 24 adjusts the phase of the exiting light rays. In this example, as the respective radial distance of the plurality of RUs 30 increases from the center of the phased metalens 24 towards the periphery of the phased metalens 24, the unique phase profiles increase an amount of phase adjustment for a given wavelength of light. Referring to FIG. 5A (blue wavelength), the center of the phased metalens 24 is indicated at (0, 0) where the phase adjustment for the three temperatures are nearly zero. As the sub-wavelength structures 25 are moved away from the center of the metalens 24, the phase adjustment increases for the three temperatures indicated.

In the examples illustrated in FIGS. 5A-5C, as the radial distance of the plurality of RUs 30 increases from the center of the phased metalens 24, the unique phase profiles increase an amount of phase adjustment for decreasing wavelengths of the light. Comparing FIG. 5A, with FIG. 5B, and with FIG. 5C, the phase adjustment for the blue light in FIG. 5A is greater than that for the green light of FIG. 5B, which is in turn greater than that for the red light of FIG. 5C. It will be understood that the wavelength of light increases from blue light to green light to red light.

In the examples illustrated in FIGS. 5A-5C, as the radial distance of the plurality of RUs 30 increases from the center of the phased metalens 24, the unique phase profiles increase an amount of phase adjustment for a given operating temperature of the camera 10. Referring to FIGS. 5A-5C, the plots of constant temperature show increasing phase adjustment as the radial distance of the sub-wavelength structures 25 increases from the center of the phased metalens 24.

In the examples illustrated in FIGS. 5A-5C, as the radial distance of the plurality of RUs 30 increases from the center of the phased metalens 24, the unique phase profiles increase an amount of phase adjustment for increasing operating temperatures of the camera 10. Referring again to FIGS. 5A-5C, as the temperature increases from −40° C. to 105° C., the amount of phase adjustment also increases.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

We claim:

1. A camera, comprising:
a phased metalens positioned between an objective lens and an imager of the camera,
the phased metalens comprising a plurality of sub-wavelength structures grouped into a plurality of arrangements at respective radial distances from a center of the phased metalens, the arrangements configured to adjust phases of light transmitted through the phased metalens based on the respective radial distances and colors of the light.

2. The camera of claim 1, wherein the eater colors of the light transmitted through the phased metalens comprise wavelengths between 400 nm to 1600 nm.

3. The camera of claim 1, wherein the eerier colors of the light transmitted through the phased metalens comprise colors of visible light.

4. The camera of claim 1, wherein the arrangements are configured to adjust the phases further based on operating temperatures.

5. The camera of claim 1, wherein the phased metalens is positioned within 1mm of an imager focal plane.

6. A system, the system comprising:
an objective lens;
an imager configured to detect an image in a field of view of the system; and
a phased metalens positioned between the objective lens and the imager, the phased metalens comprising a plurality of sub-wavelength structures grouped into a plurality of arrangements positioned at respective radial distances from a center of the phased metalens, the arrangements having respective phase profiles configured to adjust phases of incoming light based on the respective radial distances and colors of the incoming light.

7. The system of claim 6, wherein the sub-wavelength structures range from two times to eight times smaller than a the wavelengths of the incoming light.

8. The system of claim 6, wherein plurality of arrangements defines a plurality of resolution units.

9. The system of claim 8, wherein a size of a resolution unit is based on a size of image pixels of the imager.

10. The system of claim 9, wherein each of the plurality of resolution units has a size equal to four image pixels.

11. The system of claim 8, wherein each of the plurality of resolution units includes one hundred to one hundred forty-four sub-wavelength structures.

12. A system, the system comprising:
a phased metalens positioned between an objective lens and an imager configured to detect images in a field of view of a camera configured for a vehicle,
the phased metalens comprising a plurality of sub-wavelength structures grouped into a plurality of arrangements at respective radial distances from a center of the phased metalens, each arrangement of the plurality of arrangements having a unique phase profile based on the radial distance of the arrangement and a a color of light transmitted through the phased metalens.

13. The system of claim 12, wherein, as the radial distances of the plurality of arrangements increases, the unique phase profiles increase an amount of phase adjustment for a given color of light.

14. The system of claim 12, wherein each of the unique phase profiles increase an amount of phase adjustment for decreasing wavelengths of light.

15. The system of claim 12, wherein each of the unique phase profiles increase an amount of phase adjustment for increasing temperatures.

16. The system of claim 12, wherein the phased metalens is configured to cause the light to arrive at the imager at approximately the same.

* * * * *

UNITED STATES PATENT AND TRADEMARK OFFICE
CERTIFICATE OF CORRECTION

PATENT NO. : 11,818,452 B2
APPLICATION NO. : 17/367257
DATED : November 14, 2023
INVENTOR(S) : Ronald Taylor et al.

Page 1 of 1

It is certified that error appears in the above-identified patent and that said Letters Patent is hereby corrected as shown below:

In the Claims

At Column 8, Claim 2, Line 17, after "the", delete "eater".

At Column 8, Claim 3, Line 20, after "the", delete "eerier".

At Column 8, Claim 5, Line 27, delete "1mm" and insert --1 mm--.

At Column 8, Claim 7, Line 43, after "than", delete "a".

At Column 8, Claim 8, Line 44, after "wherein", insert --the--.

At Column 8, Claim 12, Line 62, delete "a a" and insert --a--.

Signed and Sealed this
Fifteenth Day of April, 2025

Coke Morgan Stewart
*Acting Director of the United States Patent and Trademark Office*